United States Patent
Szita et al.

[15] 3,666,722
[45] May 30, 1972

[54] ACRYLONITRILE COPOLYMERS CONTAINING SULFONIC ACID GROUPS

[72] Inventors: Jeno Szita, Dormagen; Ulrich Bahr, Opladen-Luetzenkirchen; Herbert Marzolph; Gunther Nischk, both of Dormagen, all of Germany

[73] Assignee: Farbenfabriken Bayer Aktiengesellschaft, Leverkusen, Germany

[22] Filed: Mar. 25, 1971

[21] Appl. No.: 128,179

Related U.S. Application Data

[63] Continuation of Ser. No. 654,351, July 19, 1967, abandoned.

[52] U.S. Cl. ................................. 260/49, 260/512
[51] Int. Cl. ................................................ C08f 19/00
[58] Field of Search ...................... 260/49, 79.3 M

[56] References Cited

UNITED STATES PATENTS

| | | | |
|---|---|---|---|
| 2,913,438 | 11/1959 | Davis et al. | 260/79.3 |
| 3,123,588 | 3/1964 | Lunney | 260/79.3 |
| 3,260,707 | 7/1966 | Caldwell et al. | 260/79.3 |
| 3,310,535 | 3/1967 | Mazzolini et al. | 260/78.5 |
| 3,328,332 | 6/1967 | Dannelly et al. | 260/30.4 |
| 3,328,333 | 6/1967 | Dannelly et al. | 260/30.4 |

OTHER PUBLICATIONS

Izumi et al., J. Polymer Sci. Al, 705– 14 (1963).
Ham, Copolymerization, N. Y., Interscience 1964, p. 556

*Primary Examiner*—Melvin Goldstein
*Attorney*—Plumley & Tyner

[57] ABSTRACT

This invention relates to acrylonitrile copolymers containing at least 50 percent by weight of acrylonitrile and up to 10 percent by weight of an ethylenically insaturated sulfonic acid compound of the formula

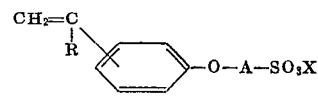

wherein R represents a hydrogen atom or a methyl group, A represents an alkylene radical and X represents hydrogen, ammonium, an alkali or an organic ammonium cation, the balance being one or more additional copolymerisable monomers, and to a process for their production by copolymerising said monomers in an aqueous medium with a redox catalyst system or in an organic polar solvent with a radical catalyst.

The copolymers show a high degree of whiteness, outstanding thermal stability and excellent textile properties together with a high affinity for basic dyes.

5 Claims, No Drawings

ACRYLONITRILE COPOLYMERS CONTAINING SULFONIC ACID GROUPS

This is a continuation of application Ser. No. 654,351, filed July 19, 1967 and now abandoned.

This invention relates to acrylonitrile copolymers containing sulfonic acid groups and to a process for their production by copolymerizing acrylonitrile with unsaturated compounds containing sulfonic acid groups, said acrylonitrile copolymers showing a high affinity for basic dyes.

The affinity for dyes of filaments and yarns made from acrylonitrile homopolymers and copolymers with neutral comonomers is not sufficient to meet practical requirements. Accordingly, it is difficult to dye them in satisfactorily deep shades with basic or acidic dyes. The reason for this lies in the complete or partial absence of dye receptive groups in the polymer. In order to overcome these difficulties, several proposals have already been put forward for modifying acrylonitrile polymers.

It has already been proposed to copolymerize acrylonitrile with basic comonomers, for example, vinyl pyridine and derivatives thereof. Thus, although it was possible in this way to increase the affinity of the resulting textile products for acidic dyes, this improvement could only be obtained at the expense of other properties such as natural color, thermal stability and affinity for basic dyes.

To improve dyeability with basic dyes, copolymers were prepared with comonomers containing carboxyl groups, for example acrylic acid, methacrylic acid or itaconic acid. Unfortunately, the resulting polymers show a very marked tendency to discolor at elevated temperatures.

Although it is possible, by including comonomers containing sulfo groups in the polymer, to improve receptivity to basic dyes, the conventional methods of doing this are in many respects unsatisfactory from the technical point of view. Sodium methallyl and allyl sulfonates can only be copolymerized with acrylonitrile in poor yields and only a fraction of the comonomers used is incorporated in the polymer. This defect is also manifested in the copolymerization of acrylonitrile with N-monosubstituted acrylamide derivatives containing sulfo groups, such as N-acryloyltaurine or N-acryloyl-p-aminophenyl-methane sulfonic acid. Although other known comonomers containing sulfo groups, for example, vinyl sulfonic acid and vinylbenzene sulfonic acid and their salts, can be copolymerized in aqueous medium, they are difficult to use in solution polymerization owing to their limited solubility in the organic solvents commonly employed. In solution polymerization, where polymerization is carried out in a solvent in which the polymer formed is soluble, the starting products and in particular the comonomers used have to be readily soluble in the reaction medium. If this is not the case, the comonomers cannot be statistically incorporated into the macromolecule, as they should be, while at the same time the tendency of the resulting solutions towards gel formation is increased, due both to the presence of undissolved particles and to salt depositions, with the result that the solutions become extremely difficult to spin.

It is an object of this invention to provide acrylonitrile copolymers containing sulfonic acid groups in the form of recurring units of the formula

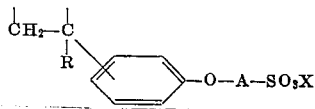

wherein R represents a hydrogen atom or a methyl group, A represents an alkylene radical with three to five carbon atoms which may be substituted by one or more alkyl radicals, and the phenyl ring may contain further substituents without active hydrogen atoms, and X represents hydrogen, ammonium, an alkalimetal or an organic ammonium cation. The acrylonitrile copolymer comprises at least 50 percent by weight of acrylonitrile and 0,1 to 10 percent by weight of an ethylenically unsaturated sulfonic acid compound of the formula

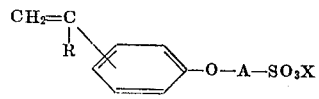

wherein R, A and X have the meanings as described above, the balance being one or more additional copolymersizable monomers.

It has been found that acrylonitrile copolymers which have an acrylonitrile content of at least 50 percent and show an improved affinity for basic dyes and high thermal stability, coupled with a limited tendency to gel in concentrated solution, can be obtained by a process in which acrylonitrile is copolymerized together with 0,1 to 10 percent of an alkenylaryloxy-alkane sulfonic acid or an alkali metal, amine or ammonium salt thereof, optionally in the presence of third comonomer, in the presence of radical-forming catalysts.

The alkenylaryloxy-alkane sulfonic acids correspond to the following general formula

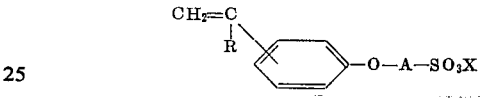

in which R represents a hydrogen atom or a methyl group, A represents an alkylene radical with three to five carbon atoms, which optionally may be substituted by one or more alkyl radicals, and X represents hydrogen, an ammonium, an alkali metal or an organic ammonium cation. The phenyl radical of the above formula may also contain further substituents without any active hydrogen atoms.

According to one of the Applicants' earlier proposals, compounds of this kind are obtained by reacting alkylphenol salts, such as alkali metal alkenyl phenolates, with sultones Such processes are further exemplified by the art as shown in German Pat. Nos. 743,570 and 1,040,042, as well as in the article by Helberger: Justus Liebigs, Annalen der Chemie, Vol. 565, page 28 (1949). The following alkenylaryloxyalkane sulfonic acids are examples of comonomers for acrylonitrile:

3-(p-isopropenylphenoxy)-1-propane sulfonic acid,
4-(p-isopropenylphenoxy)-1-butane sulfonic acid,
3-(o-vinylphenoxy)-1-propane sulfonic acid,
3-(p-vinylphenoxy)-1-propane sulfonic acid, The sulfonic acids are conveniently used in the form of their salts soluble in the reaction medium. Where copolymerization is carried out in aqueous medium, the sodium and potassium salts are preferably used. The lithium, organic ammonium or ammonium salts are preferably used for solution polymerization in organic solvents. The quantity in which it is desired to incorporate the sulfonic acids into the acrylonitrile polymer, is governed largely by the purpose for which the polymers are to be used and also inter alia by the type of polymerization and by the type of catalysts used. Catalyst systems (for example per sulfate/bisulfite) which give terminal groups combining with cationic dyes, will generally be used when polymerization is carried out in aqueous medium. If it is intended to use the copolymers for the production of filaments and fibers, it is usually sufficient to use only 0,5 to 1,0 percent by weight of the comonomers containing sulfo groups for polymerization in aqueous medium in order to obtain the level of dyeability normally required for practical purposes. In order to obtain special effects, for example a marked improvement either in the hydrophilic properties or in the swelling capacity of the polymers, the comonomers referred to may be included in the polymer in quantities of 4 to 8 percent by weight.

In the solution polymerization of acrylonitrile in organic solvents, for example dimethyl formamide, dimethyl acetamide, dimethyl sulfoxide or ethylene glycol carbonate, it is usually necessary to use more of the ethylenically unsaturated sulfonic acid compound than is required for aqueous polymerization in order to obtain the same level of dyeability. In this case, all the sulfo groups have to be incorporated by copolymerization because the preferred catalysts give neutral terminal groups. The requisite quantity of comonomers containing sulfo groups is usually from 2 to 4 percent, by weight based on the total amount of monomer. One particular advantage of the process is that the comonomers according to the invention are readily soluble in the aforementioned solvents, even in this relatively high concentration, and as a result make it possible to prepare satisfactory spinning solutions, even by solution polymerization in organic solvents.

Acrylonitrile is preferably copolymerized with the comonomer according to the invention in the presence of other copolymerizable unsaturated compounds. Compounds of this kind include inter alia acrylates and methacrylates, vinyl esters, styrene and neutral derivatives thereof, vinyl chloride, vinylidene chloride, vinyl bromide, butadiene, chloroprene, acrylamide, methacrylamide, vinyl alkyl ketones, vinylidene cyanide or divinyl compounds, as well as basic comonomers, for example, vinyl pyridine and its derivatives.

The solubility of the polymers can be substantially improved and the dyeability of the resulting fibers further increased by including in the polymer a third comonomer for example methyl acrylate, methyl methacrylate or vinyl acetate. The quantity in which these comonomers are present in the polymer may be from 2 to 10 percent by weight and is preferably from 5 to 7% by weight.

If it is desired to obtain readily dyeable polyacrylic fibers with specific properties, the additional comonomers will generally be used in a fairly large proportion relative to the acrylonitrile. If acrylonitrile is copolymerized with 1 to 3 percent by weight of the ethylenically unsaturated sulfonic acid compound and, for example, with 25 to 45 percent by weight of vinylidene chloride, it is possible to obtain highly soluble polymers and highly concentrated spinning solutions while at the same time the fibers spun from these solutions show greatly reduced inflammability in addition to their high affinity form dyes and thermal stability.

Acrylonitrile may be copolymerized with the comonomers by conventional methods of polymerization, for example in aqueous emulsion, dispersion or in solution. In the case of emulsion polymerization, conventional emulsifiers such as salts of fatty acids, alkyl or aryl sulfonates, and non-ionic emulsifiers may be used. In cases where comonomers sparingly soluble in water, for example vinylidene chloride, are used, solution promoters, for example alcohols, may be used in dispersion polymerization. Solution polymerization may be carried out in aqueous concentrated salt solutions, for example, zinc or calcium chloride solutions or solutions of inorganic thiocyanates, and in organic solvents such as dimethyl formamide, dimethyl acetamide, dimethyl sulfoxide, ethylene glykol carbonate or butyrolactone.

Polymerization in aqueous medium is preferably carried out, in the absence of emulsifiers, using water-soluble radical-forming catalysts or catalyst systems, such as inorganic or organic peroxidic compounds, or azo compounds. In general, however, it is preferred to use redox systems, particularly those based on peroxidic compounds and sulfur compounds of low oxidation stages. The water-soluble salts of peroxy-disulfuric acid for example potassium, sodium or ammonium persulfate, are preferably used as the peroxidic compounds in the redox system. Sulfur dioxide, alkali metal hydrosulfites, alkali metal pyrosulfites and alkali metal thiosulfates are extremely effective reduction components. Of these, sodium or potassium hydrogen sulfite or pyrosulfite are preferably used. The catalysts are conveniently used in quantities from 0,5 to 5 percent, by weight based on the total weight of the monomers. The ratio between oxidizing and reducing agent in the redox system can be from 2 : 1 to 1 : 50 and is preferably from 1 : 2 to 1 : 10. In order further to activate the catalyst system, small quantities of salts containing heavy metal ions, such as copper and iron, may be added. Suitable neutral salts, such as alkali metal or alkaline earth metal sulfites or phosphates, may also be present in the polymerization mixture. Other additives such as regulators, for example mercaptans, or complex-formers, for examples metaphosphoric acid, oxalic acid, ethylene diamine tetracetic acid or their salts, may also be used. Polymerization is carried out by conventional continuous-cycle or batch processes. The desalted water used is employed in a quantity 5 to 10 times larger than that in which the monomers are used. The reaction temperature may be from 10° to 70° C. and is preferably from 40° to 55° C. The pH-value of the reaction mixture is conveniently from 2 to 6 and is preferably from 2,5 to 4. Concentrated inorganic or organic acids, preferably sulfuric acid, are used to adjust the pH-value. It is often of advantage to carry out polymerization in an inert gas atmosphere (for example nitrogen). After the reaction has been stopped, optionally by the addition of inhibitors or complex-formers or by neutralizing the reaction mixture, the copolymers, formed as fine grains, are separated from the liquid phase by filtration or centrifiging, are washed with desalted water and dried at reduced pressure or in a stream of heated air.

When solution polymerization is carried out in organic solvents, the quantitative ratio between monomer and solvent in the reaction mixture is variable within wide limits, depending on the solvent and on the further comonomers used, and their ratio to the acrylonitrile. If acrylonitrile is copolymerized in dimethyl formamide with only the ethylenically unsaturated sulfonic acid compound, the monomer concentration has to be kept below 25 percent by weight if clear, non-gelling solutions are to be obtained. In cases where copolymerization is carried out in the additional presence of, for example, 5 to 8 percent by weight of methyl acrylate or vinyl acetate, the initial monomer concentration may be as much as 40 percent by weight, although it is preferably from 25 percent to 35 percent by weight, without any danger of the solution gelling or clouding during or after completion of polymerization. In the terpolymerization of acrylonitrile with 25 to 45 percent by weight of vinylidene chloride, the concentration of the monomers in dimethyl formamide may with advantage be from 30 to 60 percent by weight. Due to the lower solubility of the monomers in dimethyl acetamide, ethylene carbonate and dimethyl sulfoxide, the limits to their initial concentration in these solvents are generally 5 percent to 10 percent by weight lower than in dimethyl formamide.

Radical-forming catalyst systems soluble in the solvents used may be employed to initiate polymerization. Examples of such catalysts include azo compounds such as azo-isobutyronitrile, inorganic peroxides such as ammonoum persulfate, organic hydroperoxides, ketone peroxides, acyl peroxides or peroxyesters. Redox systems which are also effective at relatively low temperatures, are preferably used. Systems of this kind may comprise the aforementioned organic peroxides in conjunction with reducing compounds, for example, sulfinic acid derivatives. Effective reducing components based on sulfinic acids include alkalimetal or amine salts of sulfinic acid, sulfinic acid esters and amides as well as α-aminosulfones or formamidine sulfinic acid. With redox systems of this kind, the presence of a concentrated acid, for example sulfuric acid or an aromatic sulfonic acid, is advantageous and in some instances is necessary. Some of the aforementioned sulfinic acid derivatives, such as their salts and amides, are effective polymerization catalysts in the presence of concentrated acids, even in the absence of peroxides.

The reaction mixture usually contains up to 3 percent by weight of the aforementioned catalysts. In the case of redox systems, the preferred molar ratio between peroxide and sulfinic acid derivative is from 1 : 0,2 to 1 : 4. The acid may be used in as high as a fourfold molar excess relative to the sulfinic acid derivative.

The presence of small quantities of water in the solution is usually of advantage. When dimethyl sulfoxide or ethylene carbonate is used as the solvent, the water content can be from 10 to 15 percent by weight.

The polymerization temperature is variable within a wide range from 0° to 100° C depending on the type of catalyst and solvent used, although polymerization is preferably carried out at a temperature from 25° to 60° C. After the requisite rate of conversion or solution concentration has been reached, polymerization is stopped by the addition of a conventional inhibitor. Thereafter, the solution may be dry-spun or wet-spun by known methods, either directly or following removal of any unreacted monomers, for example in a falling-film evaporator at reduced pressure. The spinning solutions thus obtained are either colorless or show only a slight yellowish tinge, and are clear and gel-free so that they can be further processed without any difficulty. Following removal of unreacted monomers, they can be stored for prolonged periods without any appreciable change in their viscosity.

The polymers obtained by aqueous precipitation polymerization can also be processed by suitable solution processes to form clear, gel-free spinning solutions which can be spun without any difficulty.

The spun filaments show a high degree of whiteness, outstanding thermal stability and excellent textile properties. Their high affinity for basic dyes is attributable to the complete incorporation of the ethylenically unsaturated sulfonic acid derivatives.

The following examples are to illustrate further this invention without limiting it.

The percentages given in the specification and in the following examples are percentage by weight, based on the total quantity, unless otherwise stated.

EXAMPLE 1

65 liters of desalted water were introduced into a double-walled enamelled 100-liter capacity vessel equipped with stirring mechanism, reflux condenser, nitrogen inlet and thermostat, the pH was adjusted to 3.5 with n-sulphuric acid and heated to 55° C. 4.715 kg of acrylonitrile, 250 g. of methyl acrylate, 35 g of the compound

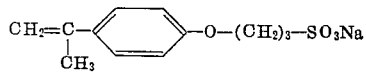

22 g of potassium persulfate and 130 g of sodium pyrosulfite (the last two components each being dissolved in 500 ml. of water), were then added in that order. The reaction mixture was stirred for 4 hours at 50° C. under a nitrogen pressure of 5 to 10 mm. Hg, and the resulting fine-grained polymer was isolated in a filter centrifuge, washed free of acid with desalted water and dried in vacuo at 60° C. The dried polymer weighed 4.35 kg (yield = 87 percent). It had a K-value of 84.4 (Fikentscher, Cellulosechemie 13, page 56, 1932).

EXAMPLE 2

The following reaction mixture was polymerized as described in Example 1: 46 liters of water, 3.325 kg. of acrylonitrile, 175 g of the sodium salt of 3-(p-isopropenyl-phenyloxy)-1-propane sulfonic acid, 32 g. of potassium persulfate and 160 g of sodium pyrosulfite. After 4 hours, the yield amounted to 89 percent. The polymer had a K-value of 92.6.

In order to test the tendency of the copolymers obtained to discolor, they were heated in 5 percent by weight solution in dimethyl formamide at 80° C. in the presence of air. The extinction coefficients of the solutions were measured after 2, 4 and 20 hours by means of an electrophotometer (Type Elko III, manufactured by ZEISS) at a wavelength of 470 mµ (cell length = 5 cm., comparison solution pure dimethyl formamide). An acrylonitrile homopolymer with a K-value of 85.6, prepared as described in Example 1, was used for comparison. The measurements taken are set out in the following Table:

TABLE I

| Polymer from Example No. | Extinction coefficients 2 hours | at 4 hours | 470 mµ after 20 hours |
|---|---|---|---|
| 1 | 0,315 | 0,385 | 0,645 |
| 2 | 0,330 | 0,380 | 0,615 |
| Comparison | 0,565 | 0,682 | 1,185 |

The sulfo groups incorporated in the polymer were detected as follows by potentiometric titration in dimethyl formamide solution:

1 g of polymer is dissolved in 100 ml of distilled dimethyl formamide treated with a mixed-bed ion exchanger. Approximately 5 cm³ of the mixed-bed ion exchanger are introduced into the solution which is then stirred for from 30 minutes to 1 hour. The solution is then similarly treated with a strongly acid ion exchanger. After this, it is filtered off, 50 ml being titrated with an N/100 methanolic KOH-solution. A Knick pH-meter (Type 52, calomel glass electrode) was used as the measuring instrument. The measurements are given in milliequivalents of acid groups per 100 g of polymer (meq. acid gr./100 g PM) in Table II.

The improved affinity of the aforementioned copolymers for basic dyes can be demonstrated very easily by dyeing films formed from them. For this purpose, films were cast from approximately 15 percent by weight dimethyl formamide solutions in a layer thickness of approximately 50 µ. After drying for 24 hours in vacuo at 60° C. the films were washed free from solvent with hot water and then dried. The films thus obtained were dyed as follows with the basic dye Astrazonblau B (color Index, 2nd Edit., Vol. III, No. 42140): Composition of the dye bath:

100 ml of Astrazonblau B-solution (1g/l)
2 ml of acetic acid (30g/l)
0.3 ml of sodium acetate (40 g/l)

The dye is dissolved in boiling water, filtered and measured off while still hot. 0.5 to 1 g of film is added at a dye bath temperature of 80° C, being dyed for 1 hour after the boiling temperature has been reached. The dyed films were thoroughly washed with water and dried.

In order quantitatively to determine the amount of dye absorbed, the dyed films were carefully dissolved in dimethyl formamide containing 1 g/liter of sulfuric acid. Determination was effected by measuring the extinction coefficient at a wavelength of 625 mµ (absorption maximum of the dye) with a spectrophotometer and a calibration curve (extinction - g/l of dye). The measurements are set out in Table II (g of dye x 100/g of film):

TABLE II

| Polymer from Example No. | mVal of acid gr. / 100 g PM | g of dye × 100 / g of film |
|---|---|---|
| 1 | 4,8 | 0,68 |
| 2 | 18,2 | 2,82 |
| comparison | 2,5 | 0,29 |

The polymers described in Examples 1 and 2 were readily soluble in dimethyl formamide, giving gel-free 26 percent by weight spinning solutions which could be spun into filaments without any difficulty by a conventional dry-spinning process. Following the usual after-treatment, the filaments were naturally white and showed better thermal stability than the homopolymer used for comparison when treated with a stream of hot air. It was possible to dye them in deep and very deep shades with basic dyes.

EXAMPLE 3

A 100 ml-capacity long-necked flask with a ground glass joint was filled with the following reaction mixture, closed and heated in a water bath at 35° C:

65 g of dimethyl formamide, 32,9 g of acrylonitrile, 2,1 g of methyl acrylate, 0,85 g of the lithium salt of 3-(p-isopropenylphenyloxy)-propane sulfonic acid, 0,23 g of mono-tert.- butyl permaleate (50 percent by weight paste in dimethyl phthalate), 0,16 g of p-toluene sulfinic acid amide and 0,15 g of concentrated sulfuric acid. A highly viscous, almost colorless solution with a polymer concentration of 26,3 percent (yield 75 percent) was formed within 12 hours. The polymer had a k-value of 77,6. The films prepared from the solution could be dyed in deep shades with basic Astrazon dyes. 6,7 meg. of acid groups per 100 g of polymer were found by potentiometric titration as described above.

EXAMPLE 4

55 g of dimethyl formamide, 28,3 g of acrylonitrile, 15,7 g of vinylidene chloride, 1,0 g of the lithium salt of 4-(p-isopropenylphenyloxy)-1-butane sulfonic acid, 0,33 g of mono-tert.-butyl permaleate, 0,23 g of benzene sulfinic acid amide and 0,15 g of concentrated sulfuric acid, were treated for 20 hours at 35° C. in a pressure-tight sealed glass vessel. A clear, pale yellow and viscous solution containing 32 percent of polymer (yield 71 percent, K-value 75,2) was formed. It showed good spinning properties.

Films were prepared from the solution and dyed with the basic dye Astrazonblau B as described in Example 2. Determination of the amount of dye on the film showed that 1,69 percent by weight of dye had been absorbed. An acrylonitrile/vinylidene chloride copolymer prepared under similar conditions, but without any acid comonomer (control), absorbed hardly any dye. A hot-air test carried out at 160° C showed that films prepared from the polymer according to the invention discolored less than those prepared from the comparison polymer.

We claim:

1. An acrylonitrile copolymer comprising at least 50% by weight of copolymerized acrylonitrile, 0.1 to 10% by weight of an ethylenically unsaturated sulfonic acid compound of the formula

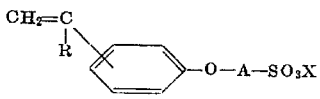

wherein
R represents a hydrogen atom or a methyl group;
A represents an alkylene radical with three to five carbon atoms which may be substituted by one or more alkyl radicals, and the phenyl ring may contain further substituents without active hydrogen atoms, and
X represents hydrogen, ammonium, an alkali metal or an organic ammonium cation, the balance being one or more additional copolymerizable monomers.

2. The acrylonitrile copolymer of claim 1, wherein said ethylenically unsaturated sulfonic acid compound is 3-(p-isopropenyl-phenyloxy)-propane sulfonic acid.

3. The acrylonitrile copolymer of claim 1, wherein said ethylenically unsaturated sulfonic acid compound is 4-(p-isopropenyl-phenyloxy)-1-butane sulfonic acid.

4. The acrylonitrile copolymer of claim 1, wherein said additional copolymerizable monomer is methylacrylate.

5. The acrylonitrile copolymer of claim 1, wherein said additional copolymerizable monomer is vinylidene chloride.

* * * * *